May 10, 1932.  E. W. MIKAELSON  1,857,251
THREADING MACHINE
Filed Dec. 18, 1928   6 Sheets-Sheet 6

Inventor
Erik W. Mikaelson
By Watson, Coit, Morse & Grindle
Attorneys

Patented May 10, 1932

1,857,251

UNITED STATES PATENT OFFICE

ERIK W. MIKAELSON, OF EASTON, PENNSYLVANIA

THREADING MACHINE

Application filed December 18, 1928. Serial No. 326,866.

This invention relates to threading machines and has for its object the provision of novel means for disengaging the thread cutting elements from the stock on which the thread is cut. Although the means disclosed herein for accomplishing this function is of general application and may be used with any type of threading machine, it is particularly useful with machines which are adapted for the threading of pipes or tubes and which are operated in conjunction with mechanism for facing or cutting off the threaded end of the pipe.

It is frequently necessary to cut off and true up or face the ends of pipe or other stock before these ends are threaded, and it has been found that the handling of the material is facilitated by locating the mechanism for performing this facing or cutting off operation beyond and in alignment with the threading machine. For this purpose the thread cutting elements must be arranged for withdrawal from operative engagement with the stock, so that the stock may be passed through the threading machine into a suitable position for performing the cutting off operation. It is also desirable to provide mechanism for automatically terminating the threading operation when the required length of thread has been cut. In the present invention, these results are effectively secured by the provision of means operable by the feeding movement of the pipe or other stock during the threading operation to move the thread cutting member out of the operative position on completion of the cutting of a predetermined length of thread. The threading is thereby terminated and free movement of stock through the threading machine for the facing or cutting off operation is permitted.

The mechanism for moving the thread cutting member out of threading position may be conveniently set in motion at the proper time by an actuating or controlling member extending into the path of movement of the stock and movable by the stock during the progress thereof through the machine while the thread is being cut. In the use of an actuating member of this type with a combined threading and cutting off machine such as heretofore described, this actuating member forms an obstacle to the free passage of the stock through the threading machine. This difficulty is overcome in the present invention by so constructing the parts that the movement of the actuating member initiated by the moving stock results in withdrawing the member from the path of movement of the stock. The withdrawal of this member therefore serves the double purpose of actuating the mechanism which disengages the thread cutting member from the stock and of permitting the stock to be thereafter freely moved through the threading machine.

It is a further feature of this invention to provide a power actuated mechanism for moving the thread cutting member to inoperative position, and to provide a novel form of mechanical movement for setting said power actuated mechanism in motion, this mechanical movement being particularly useful in the combination disclosed herein, but being capable of use for other purposes also.

Still another feature of this invention is the provision of means for taking up wear in the moving parts of the thread cutting member and ensuring accurate alignment thereof.

Other objects and features will be apparent from the following description of the invention taken in connection with the accompanying drawings, in which.

Figure 1:
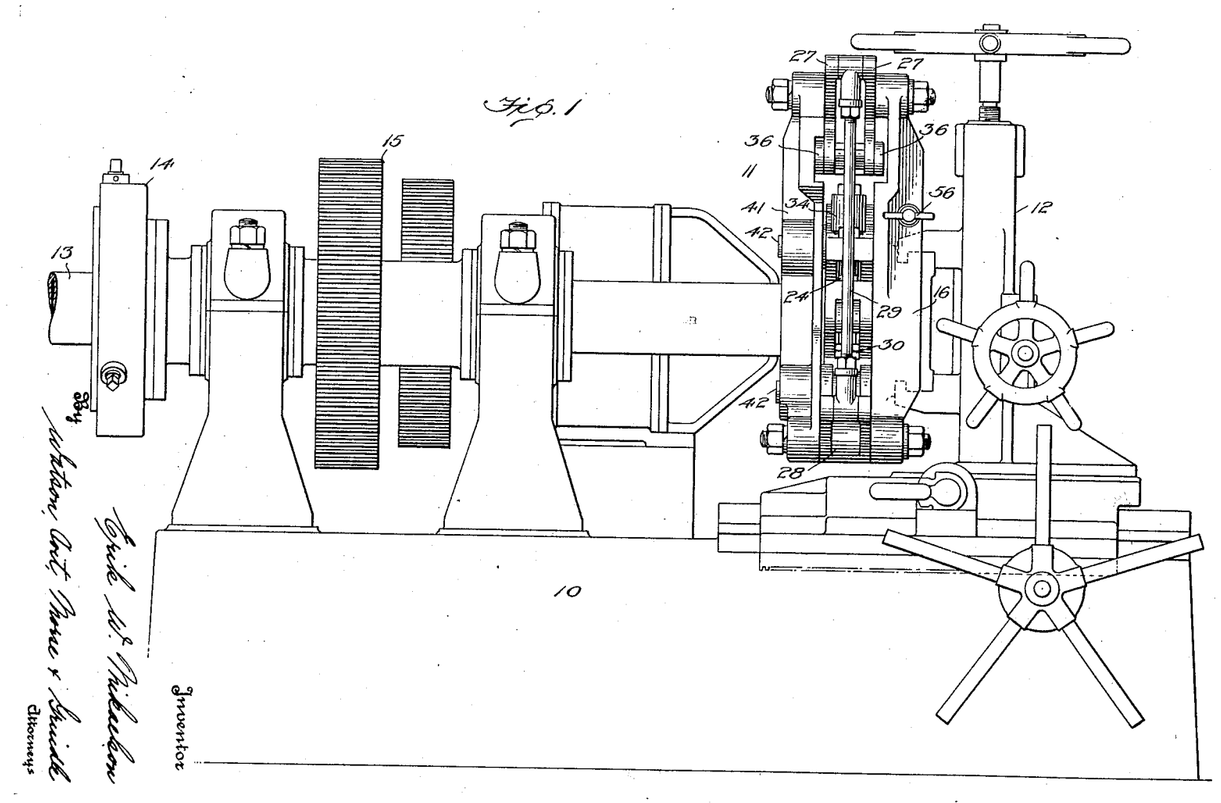
Figure 1 is an elevation of a threading machine embodying my invention.
Figure 2:
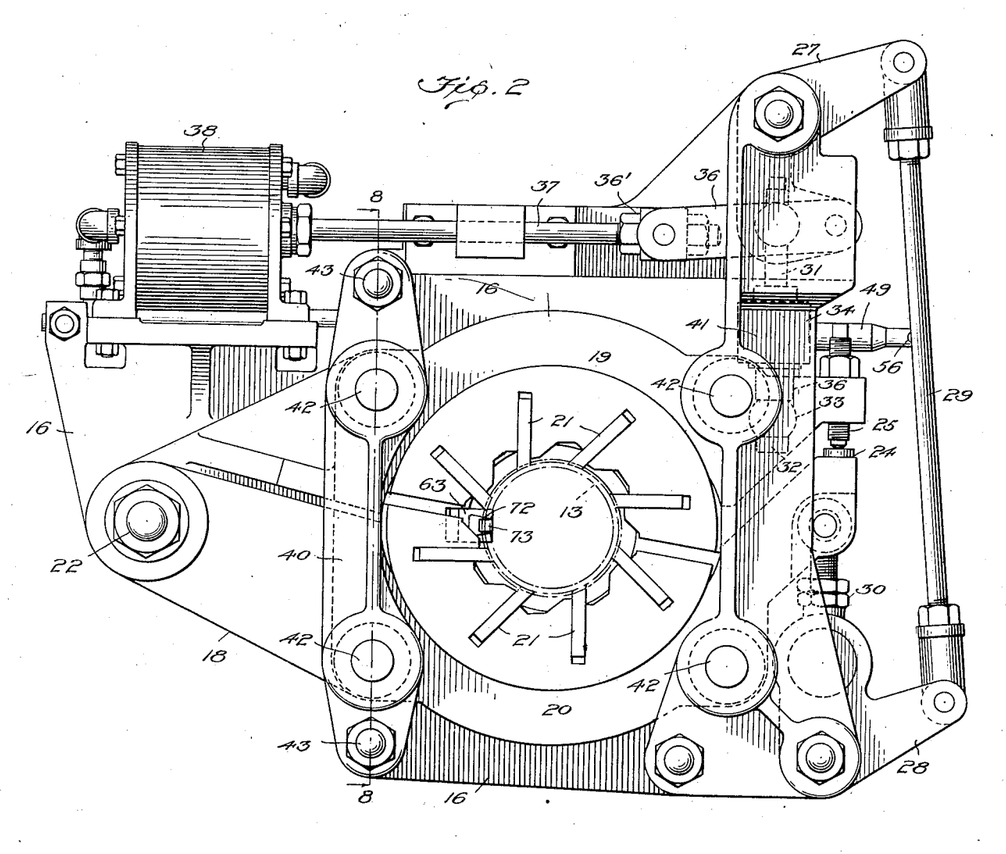
Figure 2 is an end view of the thread cutting member showing the power actuated mechanism for disengaging the cutting tools from the stock.

In the embodiment disclosed herein, I have shown my invention as applied to a threading machine of that type in which the work is rotated and the thread cutting member is held stationary. It is to be understood, however, that my invention is equally applicable to other types of machines. Figure 1 of the drawings discloses a base 10 on which the threading machine, indicated generally at 11, and the facing or cutting off mechanism, indicated at 12, are mounted. The stock or pipe 13 is inserted from the left-hand end of the threading machine and is gripped by a rotating chuck 14. This chuck may be rotated in any convenient manner, but is preferably driven by gearing 15 supported on the base 10. The threading mechanism proper is shown in Fig. 2 of the drawings and comprises a supporting member 16 and a sectional threading member 18, the last mentioned member comprising two sections 19 and 20. These sections are pivotally mounted at 22 on the support 16 and serve to support the thread cutting tools 21, which are commonly known as chasing tools. It will thus be seen that the sections 19 and 20 may be separated to disengage the chasing tools from the stock, the disengaged or inoperative position of the parts being shown in Figure 3 of the drawings. An abutment 24 is provided on the section 20 and a cooperating abutment 25 is screw threaded into a portion of the section 19 for limiting the movement of the sections to work engaging position. The abutment 25 may be adjusted to accurately determine the proper position of the parts during the threading operation.

Figure 3:
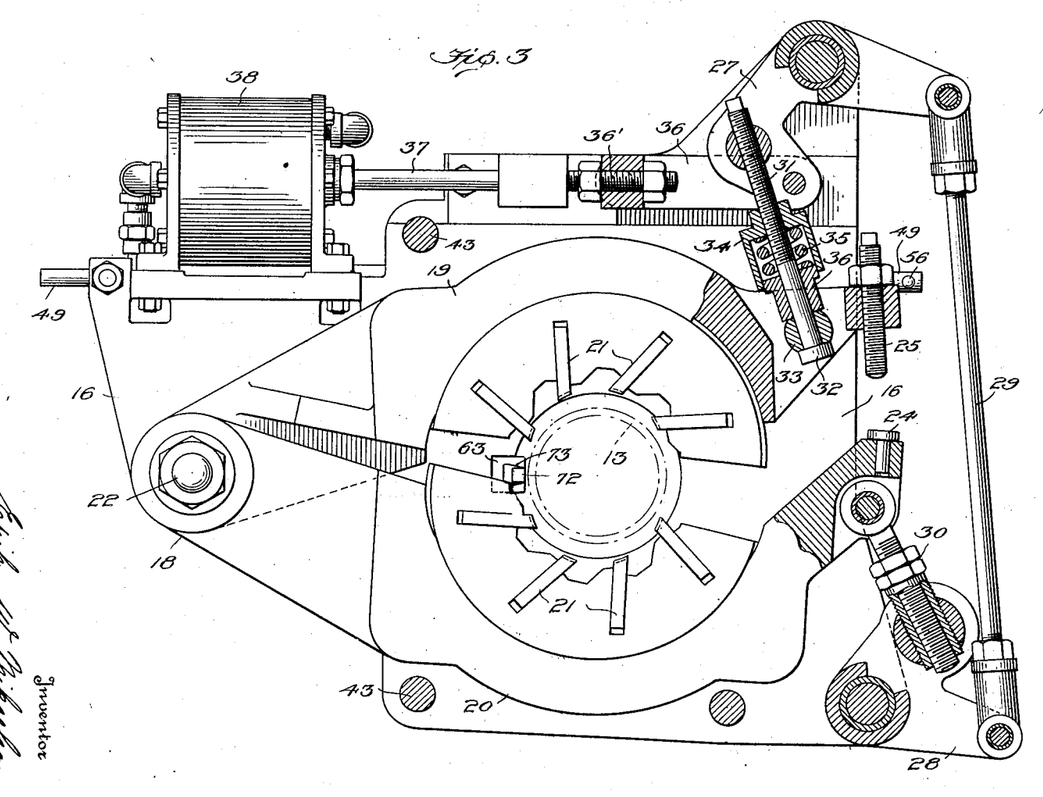
Figure 3 is a view similar to Fig. 2, showing the thread cutting member in disengaged or inoperative position and with a portion of the parts in cross section.
Figure 4:
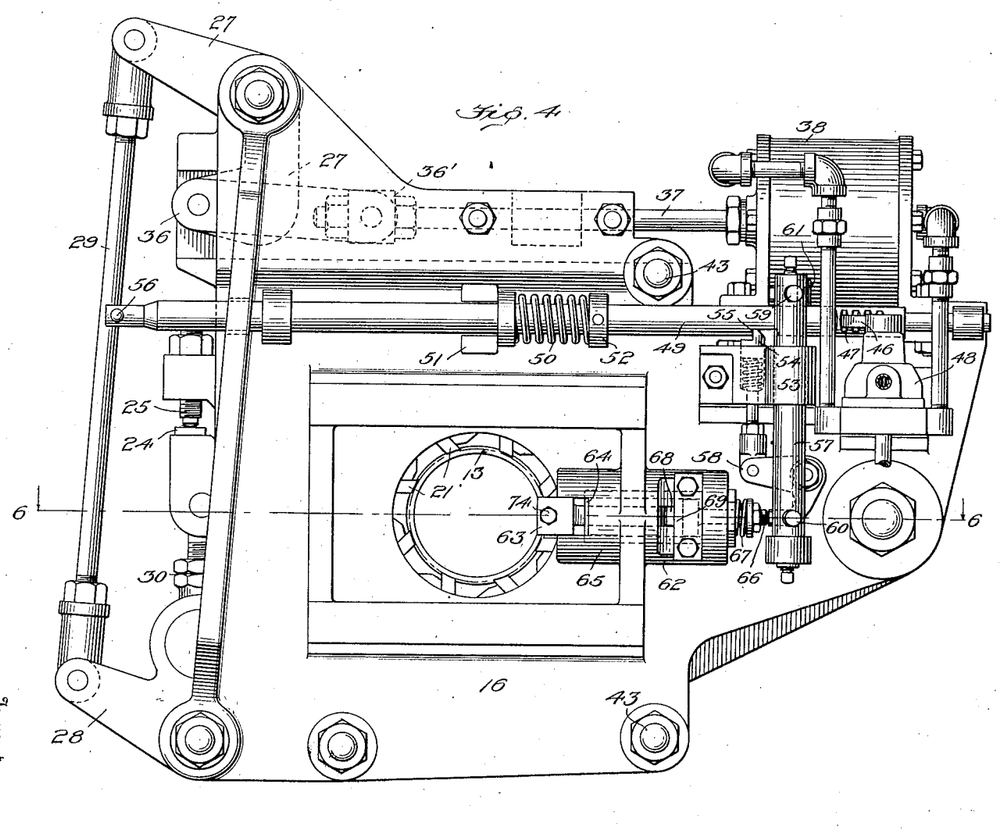
Figure 4 is an end view of the threading machine disclosing the controlling means for the power actuated mechanism.
Figure 5:
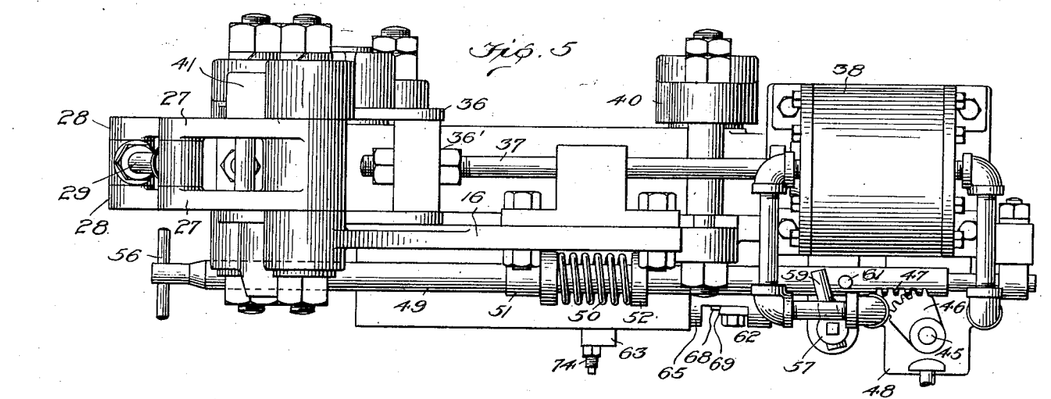
Figure 5 is a plan view of the parts disclosed in Fig. 4.

The power actuated mechanism for controlling the pivotal movement of the sections 19 and 20 may be constructed in various ways, but preferably comprises a pair of bell crank levers 27 and 28 which may be mounted on any convenient portion of the supporting member 16 and which are connected by a link 29. The opposite arms of these bell crank levers are adjustably connected with respective sections of the threading member, one of these adjustable connections being shown at 30. The connection between the remaining bell crank lever and the corresponding section comprises a rod 31 which is threaded into the bell crank lever at one end and is provided with a headed portion 32 at its opposite end for cooperation with a member 33 formed on the section 19. An element 34 threaded on rod 31 serves as an adjustable abutment for a spring 35. At its opposite end this spring engages a sleeve 36 which is in turn in contact with the member 33. It will be seen that this connection serves to resiliently hold the section 19 in work engaging position, this section being positively withdrawn from the work by actuation of the lever 27. The bell crank levers 27 and 28 are simultaneously actuated by means of a link 36 pivoted to one arm of the lever 27, this link having an adjustable connection, indicated at 36', with a piston rod 37. This rod may be operated in any suitable manner, but is preferably controlled by means of a fluid operated device 38 which is mounted on the supporting member 16. Operation of the device 38 thus serves to rock the bell crank levers 27 and 28 to effect simultaneous movement of the sections 19 and 20 of the threading member about their point of pivotal support 22.

Figure 8:
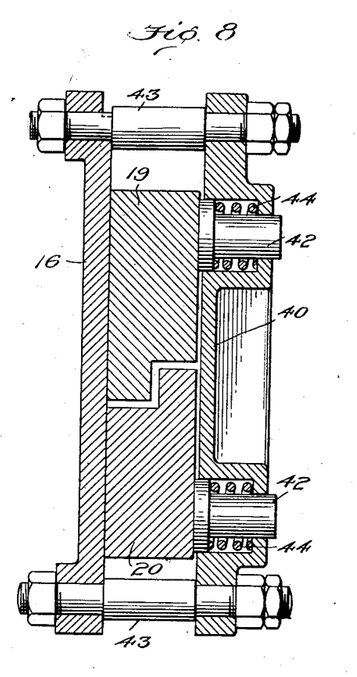
Figure 8 is a section on the line 8—8 of Fig. 2.

Since it is important to maintain the sections 19 and 20 in accurate alignment, and since these sections are subject to frequent movement during the operation of the machine, it has been found necessary to provide means for assuring the retention of the sections in their proper plane of movement. The invention therefore contemplates the provision of means for maintaining the side faces of the sections 19 and 20 in engagement with the member 16 over a substantial portion of the surface thereof regardless of the position of the sections. One such means is illustrated in the drawings, and comprises plates 40 and 41 located on each side of the zone of operation of the chasing tools. Figure 8 shows a cross section taken through the plate 40, from which it will be seen that this plate is mounted on the member 16 by means of shouldered bolts 43 for spacing the plate 40 a sufficient distance from the member 16 to accommodate the sections 19 and 20 therebetween. It is obvious that the spacing between these parts might be so designed as to maintain the sections 19 and 20 in close working engagement with both the plate 40 and the supporting member 16. Under these conditions, however, the wear between the parts due to the frequent opening and closing of the sections soon results in an undesirable amount of clearance so that the sections of the threading member are not held in close alignment, causing improper cutting or mutilation of the threads. This difficulty is overcome in the present invention by the provision of bearing members 42 which are slidably mounted in the plate 40 and are actuated by springs 44 into engagement with the side faces of the sections 19 and 20, thus retaining these sections in close engagement with the supporting member 16. Since the spring pressed bearing members are located at spaced points on each side of the chasing tools, the sections 19 and 20 are maintained in proper working relationship regardless of wear.

As hereinbefore pointed out, it is important to so construct the controlling means for the power actuated mechanism that the latter will not interfere with the free movement of the stock or pipe through the threading machine for the purpose of cutting off or facing the end of the pipe. This means may assume any suitable form, but is preferably constructed as shown in Figs. 4, 5, 6, 9 and 10 of the drawings, in which the member which is interposed in the path of movement of the pipe or stock is withdrawn therefrom to initiate the movement of the power actuating mechanism. A valve of any suitable construction, indicated at 48, is provided with a rotatable stem 45 by which the admission of fluid to the device 38 may be regulated. This stem is provided with a segment 46 which is in turn engaged by rack teeth 47 formed on the rod 49. A spring 50 which is confined between a fixed abutment 51 and an abutment 52 on the rod, serves to move the latter to the right in Fig. 4 for operating the valve 48 to admit fluid to one end of the device 38. This device is then operated by the fluid to rock the bell crank levers 27 and 28 to open the sections 19 and 20 of the threading members. A slidable spring pressed latch 54 mounted in a bracket 53 secured to the member 16 normally engages a corresponding projection 55 on the rod 49 to retain the latter against the action of the spring 50. When the rod is so retained, the valve 48 is positioned for admitting fluid to the opposite end of the device 38, to cause the said device to actuate the sections 19 and 20 into operative relationship with the stock. The latch 54 is pivotally secured to one arm of the bell crank levers 58, this lever being pivoted on a convenient portion of the member 16. A member 57 which is rotatably mounted in the bracket 53 is provided at its upper end with an abutment 59 and at its lower end with a similar abutment 60. The abutment 59 is positioned in the path of movement of an abutment 61 on the rod 49 and is adapted to be engaged thereby on movement of the rod 49 to the left in Fig. 4 to rotate the member 57. The abutment 60 is adapted to engage the free arm of the bell crank lever 58. It will thus be seen that movement of the rod 49 to the left in Fig. 4, for which purpose a handle 56 is provided on the rod, will serve to compress the spring 50 and to operate the valve 48 for moving the sections of the threading member to the closed or operative threading position. At the same time, the abutment 60 will be moved out of the path of the free arm of the bell crank lever 58 to permit the latch 54 to drop behind the shoulder 55 on the rod 49, thus retaining the latter against movement under the influence of the spring 50.

Figure 6:
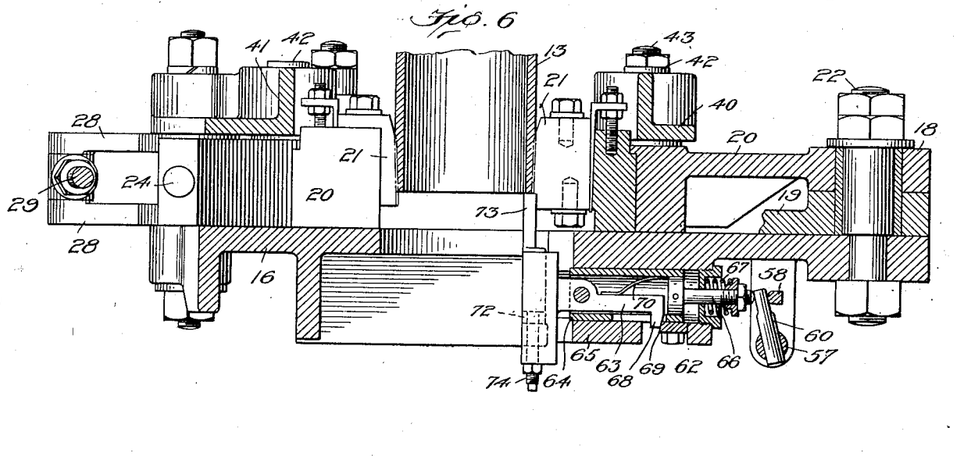
Figure 6 is a section on the line 6—6 of Fig. 4.
Figure 7:
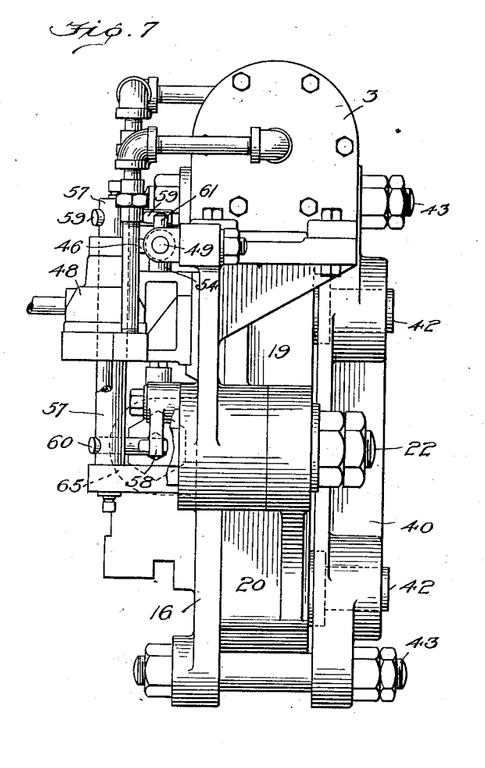
Figure 7 is an end elevation of the controlling device and power actuated mechanism.
Figure 9:
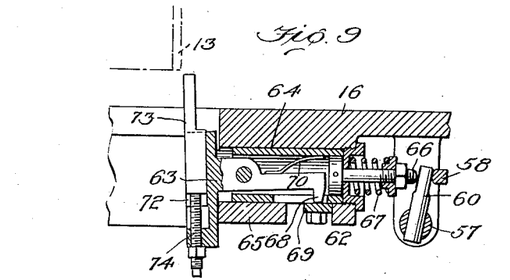
Figure 9 is a sectional view showing the details of the stock controlled actuating member which constitutes a portion of the mechanical movement.
Figure 10:
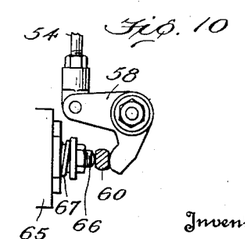
Figure 10 is a fragmentary view showing further details of this movement.

Suitable trip mechanism 62 may be provided to actuate the bell crank lever 58 to withdraw the latch 55 and permit the power actuated mechanism to open the sections of the threading member. A preferred form of this trip mechanism is shown in Figs. 6 and 9, in which a member, indicated at 63, is pivoted within an element 64 which is in turn slidably mounted in a guide 65 formed on or secured to the supporting plate 16. Pinned to the element 64 is a stud 66 which is of sufficient length to engage the abutment 60. It will be noted that this abutment is positioned between the stud 66 and the bell crank 58. A suitably mounted spring 67 serves to urge the stud 66 to the right in Fig. 6 for withdrawing the element 64 and the member 63 from the path of feeding movement of the stock. The member 63 is provided with a projection 68 which is adapted to engage a shoulder 69 on the guide 65, as shown in Fig. 6. When in this position the member 63 projects into the path of movement of the stock and is adapted to be engaged thereby for rocking movement about its pivotal point against the action of the spring 70. It will be seen that when such rocking movement is initiated, the projection 68 on the member 63 will be disengaged from the shoulder 69, and the spring 67 will act to move the entire trip mechanism to the right in Fig. 6, thus withdrawing the member 63 from the path of movement of the stock. At this time the parts will occupy the position shown in Fig. 9. Such movement results in the operation of the bell crank 58 to withdraw the latch 54 from the shoulder 55 on the rod 49, and the sections 19 and 20 of the threading member are moved out of threading position as hereinbefore explained. The member 63 is preferably constructed so that the length of thread which is cut on the stock before the latter engages with the member 63 may be accurately determined. One such construction is illustrated in Fig. 9 of the drawings. A member 73 positioned in a guide portion 72 on the outer end of the member 63 is adapted for slidable movement therein toward or away from the end of the stock and is retained in the desired position of adjustment by means of the screw threaded element 74. It will thus be seen that the point at which engagement takes place between the stock and the member 63 may be predetermined by adjusting the element 74. It will be appreciated that the member 62 constitutes in effect an energy storing device, the energy being stored on compressing the spring 67 by movement of the stud 66 to the left in Fig. 9. When the member 63 is tripped, this energy is released to actuate the parts positioned in the path of movement of the stud. Such an energy storing device may, of course, assume different forms and is capable of use in other combinations than that disclosed herein. It will also be appreciated that the entire mechanical movement for controlling the valve need not be constructed in the specific manner disclosed in the accompanying drawings, in which only one embodiment of the invention has been illustrated. Various other parts of the machine constituting the invention may also assume various forms falling within the spirit and scope of the appended claims.

Having thus described the invention, what is claimed as new and desired to be secured by Letters Patent is:

1. In a machine for threading metal stock, the combination with a thread cutting device, of power actuated mechanism for moving said device to inoperative position, means positioned in the path of feeding movement of the stock and operable thereby for controlling said power actuated mechanism, and devices operable by movement of said means for shifting said means out of the said path of movement of the stock during the controlling operation.

2. In a machine for threading metal stock, the combination with a thread cutting device, of mechanism for moving said device to inoperative position, controlling means for said mechanism positioned in the path of movement of said stock, said means being automatically movable upon engagement by said stock to a position out of the said path for initiating the movement of said mechanism, and means for retaining said controlling means in such position.

3. In a pipe threading machine, the combination with a thread cutting device, of mechanism for disengaging said device from the pipe, means extending into the path of feeding movement of said pipe for actuating said mechanism, and means operable on engagement of the pipe with said first named means for withdrawing the latter out of the said path and into position for actuating said mechanism.

4. In a pipe threading machine, the combination with a thread cutting device, of mechanism for disengaging said device from said pipe, means extending into the path of feeding movement of said pipe and movable out of the said path and into position for initiating the movement of said mechanism, and means operable on completion of a predetermined feeding movement of the pipe for moving said first named means into the said position.

5. In a machine for threading metal stock, the combination with a thread cutting device, of power actuated means for moving said device to inoperative position, means normally biased to move to a position for initiating operation of said power actuated means, and a member for restraining said second mentioned means from movement to the said position, said member extending into the path of movement of the stock during the threading operation, and being operable on engagement by said stock to move out of the path of movement thereof to release said second mentioned means.

6. In a machine for threading metal stock, the combination with a thread cutting device, of a power actuated mechanism for disengaging said device from said stock, means normally biased to move to a position for initiating operation of said power actuated mechanism, a latch movable with said means and extending into the path of movement of said stock during the feeding operation, and adapted on engagement by said stock to release said means for movement to the said position.

7. In a machine for threading metal stock, the combination with a thread cutting device, of a power actuated mechanism for disengaging said device from said stock, means movable to a position for initiating operation of said power actuated mechanism, means to urge said first mentioned means to the said position, a fixed member, and a latch movable with said first mentioned means and engaging said fixed member to retain said first mentioned means against movement to the said position, said latch extending into the path of movement of said stock, and being disengageable from said fixed member by the moving stock to release said first mentioned means.

8. In a machine for threading metal stock, the combination with a thread cutting device, of a power actuated mechanism for disengaging said device from said stock, means normally biased to move to a position for initiating operation of said power actuated mechanism, a latch movable with said means and extending into the path of movement of said stock during the feeding operation, and adapted on engagement by said stock to release said means for movement to the said position and to move therewith out of the path of movement of the stock.

9. In a machine for threading metal stock, the combination with a thread cutting device, of a power actuated mechanism for disengaging said device from said stock, means movable to a position for initiating operation of said power actuated mechanism, means to urge said first mentioned means to the said position, a fixed member, and a latch movable with said first mentioned means and engaging said fixed member to retain said first mentioned means against movement to the said position, said latch extending into the path of movement of said stock, and being disengageable from said fixed member by the moving stock to release said first mentioned means and to move therewith out of the path of movement of the stock.

10. In a machine for threading and cutting off metal stock, the combination with a threading mechanism adapted to receive stock inserted from one end thereof, of a machine for cutting off said stock located adjacent the other end of said mechanism, means for releasing said threading mechanism from said stock to permit the latter to be passed through said mechanism to said cutting off machine, said means comprising a power actuated mechanism and a controlling means for said power actuated mechanism extending into the path of movement of said stock, and means movable on engagement of said stock with the controlling means for shifting the latter to a position out of the said path for initiating the movement of said power actuated mechanism.

In testimony whereof I hereunto affix my signature.

ERIK W. MIKAELSON.